June 11, 1940.  W. B. BENNETT  2,203,771
PLANTER BOX
Filed March 4, 1939  2 Sheets-Sheet 1

Inventor
W. B. Bennett
By Clarence A. O'Brien
and Hyman Berman
Attorneys

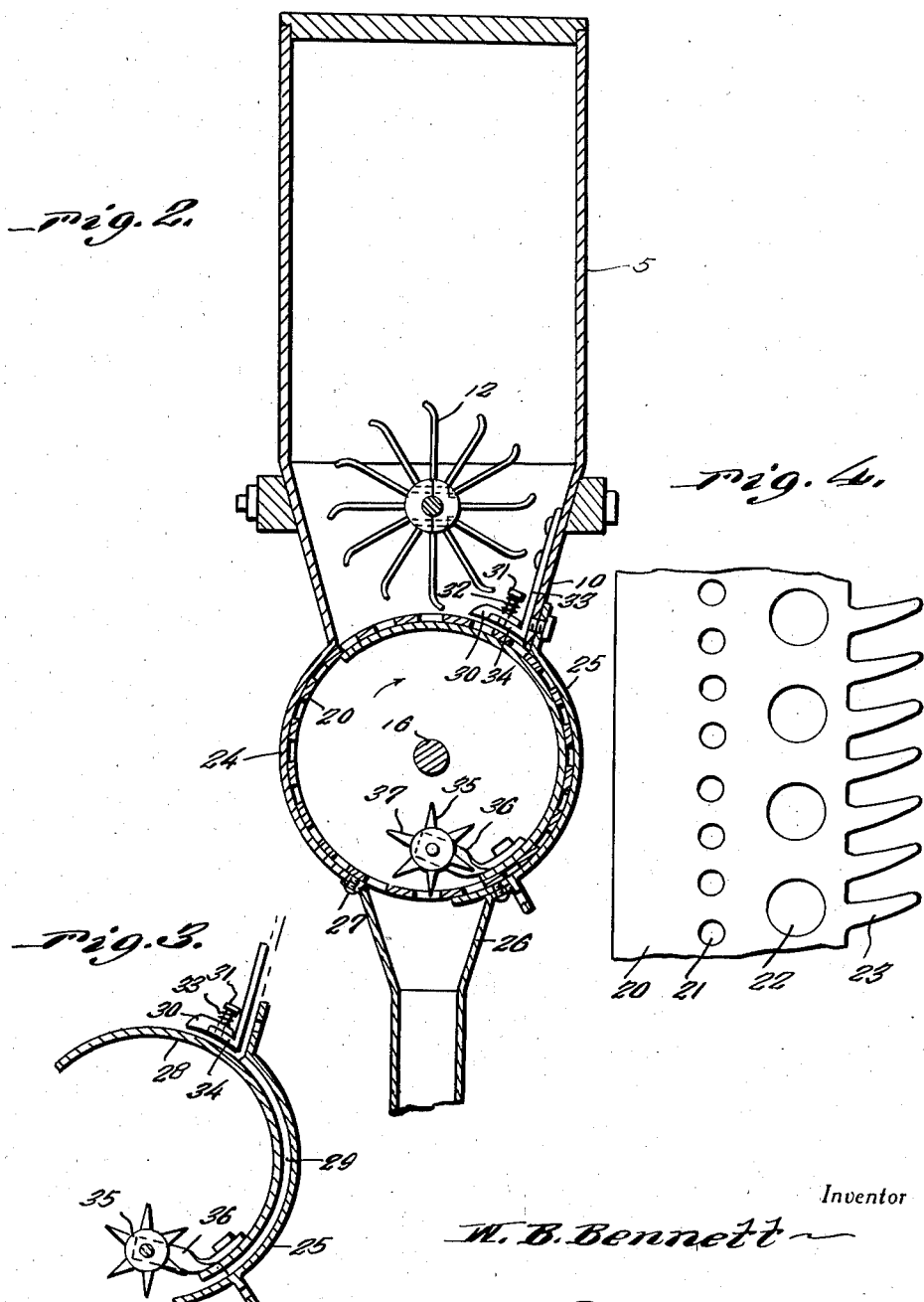

Patented June 11, 1940

2,203,771

UNITED STATES PATENT OFFICE 2,203,771

PLANTER BOX

William B. Bennett, Seagraves, Tex., assignor of one-half to William Shaw, Los Angeles, Calif.

Application March 4, 1939, Serial No. 259,882

2 Claims. (Cl. 221—137)

The present invention relates to a planter box for seed planters and embodies the provision of a rotary seed band having apertures therein adapted to receive the seed from the hopper and to convey the same singly to the discharge chute for discharging the same therefrom.

An object of the present invention is to provide a rotary seed band of this character having spaced circumferential rows of openings for receiving the seed from the discharge mouth of the hopper as the band travels under the same and to provide means for adjusting the hopper transversely with respect to the band so as to bring the discharge mouth of the hopper into registry with a desired row of openings.

A further object is to provide an apparatus of this character of simple and practical construction, which is efficient and reliable in performance, relatively inexpensive to manufacture and maintain in operation, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 2 is a similar view taken substantially at right angles to that of Figure 1.

Figure 3 is a sectional view through the inner and outer guide plates for the seed band, and Figure 4 is a fragmentary plan view of the seed band.

Figure 1:
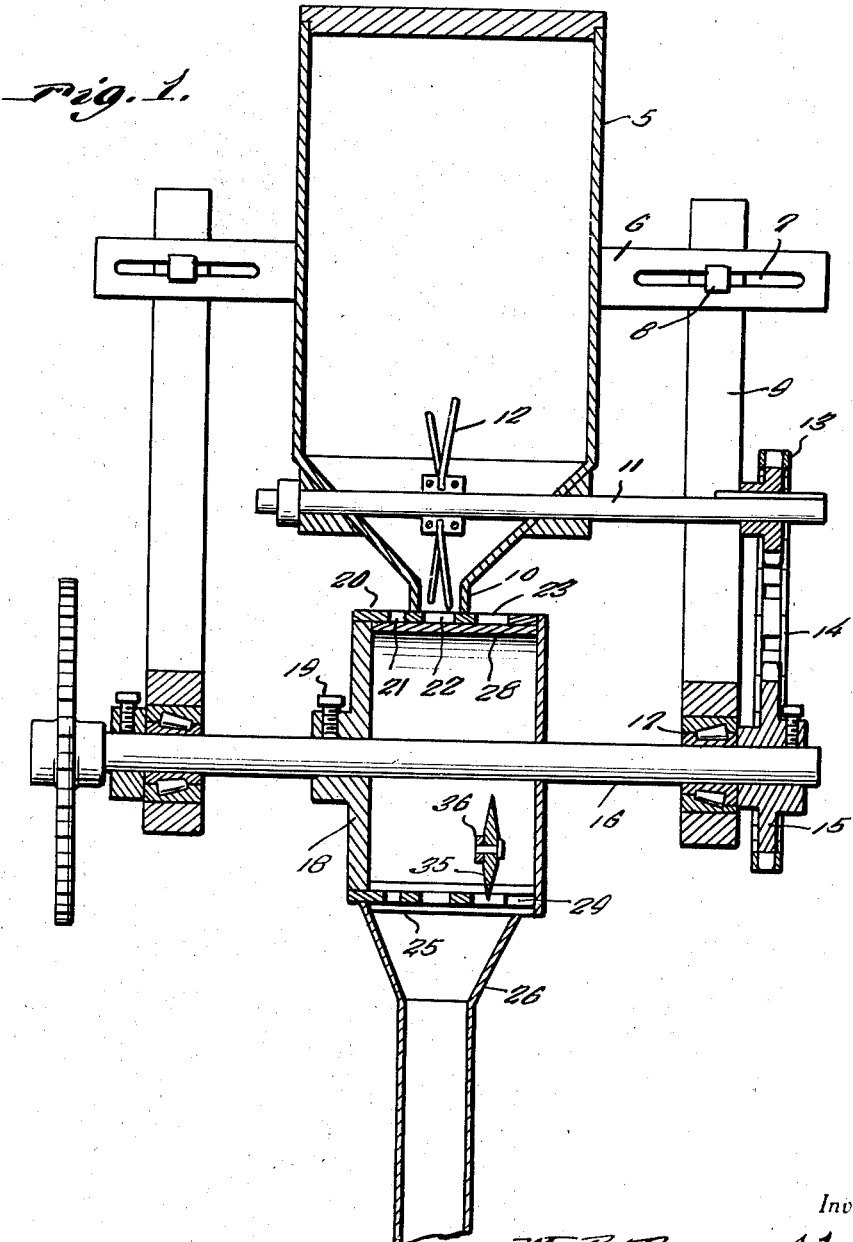
Figure 1 is a vertical sectional view through the hopper and seed band.

Referring now to the drawings in detail, the numeral 5 designates the seed hopper having a pair of supporting arms 6 extending outwardly from opposite sides thereof and provided with a slotted opening 7 for adjustably mounting the hopper on bolts 8 secured at the upper end of supporting members 9 which are suitably secured to the planter (not shown).

The bottom of the hopper is provided with a discharge mouth 10 and journaled in the walls of the hopper immediately above the discharge mouth is a shaft 11 having an agitator 12 secured thereto for operation within the mouth portion of the hopper.

The shaft 11 carries a sprocket 13 keyed thereon which is driven by a chain 14 trained over a sprocket 15 secured on a shaft 16 journaled in bearings 17 at the lower ends of the supporting members 9.

A disk 18 is secured on the shaft 16 by a set screw 19 and secured to the peripheral edge of the disk is a circular seed band 20 having a circumferential row of relatively small seed accommodating openings 21, as well as a circumferentially extending row of relatively large seed accommodating openings 22 and the free edge of the band is formed with a plurality of spaced fingers 23, the openings 21 being adapted to accommodate small grain, the openings 22 being adapted to accommodate larger grain, such as corn, and the space between the fingers 23 being adapted to accommodate cotton seed.

A portion of the band 20 is adapted to travel across the bottom of the mouth 10 of the hopper and at one side of the hopper is provided an arcuate extension 24 forming an outer cover for one side of the band. At a diametrically opposite side of the band is an outer cover plate 25 secured at its upper edge to the side of the mouth 10 and to the lower edge of said cover plate is secured one side of a discharge chute 26, said chute being also secured to the extension 24 as at 27.

An inner guard plate 28 is secured in concentric relation with respect to the outer guard plate 25 by means of a spacing block 29, the plates 25 and 28 being spaced sufficiently apart to accommodate the feed band 20 for rotary movement therebetween. The upper edge of the inner guard plate 28 extends under the mouth 20 and closes the same, the seed band being rotatable outwardly of the guard plate 28, as clearly shown in Figure 2 of the drawings, by means of which the rows of openings 21, 22 and the fingers 23 will enter the mouth of the hopper to receive the seed therefrom.

At the side of the mouth 10 of the hopper toward which the seed band 20 rotates, is provided a seed guard 30 slidably mounted on a pin 31 carried by a bracket 32, the pin being provided with coiled spring 33 yieldably urging the guard downwardly upon the foot portion 34 of the bracket with one end of the guard overlying the seed band 20 to prevent jamming of the seed at that side of the mouth of the hopper.

In the operation of the device it will be apparent that the hopper 5 may be moved transversely with respect to the seed band 20 to register the mouth 10 of the hopper over a desired row of the seed openings and upon the rotation of the feed band in the direction shown by the arrow in Figure 2 of the drawings, the seed will enter the openings and will travel between the plates 25 and 28 toward the discharge spout 26 and into which the seed are deposited for discharge therefrom.

The agitator 12 is usually employed only when cotton seed is being planted, and for this purpose a picker wheel 35 is also provided which is rotatably secured on a bracket 36 adjacent the inside of the inner plate 28 adjacent the bottom thereof, said picker wheel being provided with teeth 37 adapted to enter the space between the fingers 23 to eject the seed therefrom.

It is believed the details of construction and manner of operation of the device will be readily understood from the foregoing without further detailed explanation.

Having thus described the invention, what I claim is—

1. A feed distributor comprising a hopper, means for adjustably supporting the hopper horizontally, said hopper having a discharge mouth, an arcuate extension on one side of the mouth, an arcuate removable cover plate at the other side of the mouth, said extension and cover plate cooperating to form the side walls of a casing, a discharge spout connected to the lower edges of said extension and said cover plate, a rotatable shaft, a disk secured to the shaft, and a circular seed band carried by the disk and rotatably mounted in said casing, said band having a plurality of circumferential rows of openings adapted for selectively registering with the mouth of the hopper upon horizontal adjustment thereof.

2. A feed distributor comprising a hopper, means for adjustably supporting the hopper horizontally, said hopper having a discharge mouth, an arcuate extension on one side of the mouth, an arcuate removable cover plate at the other side of the mouth, said extension and cover plate cooperating to form the side walls of a casing, a discharge spout connected to the lower edges of said extension and said cover plate, and a rotatable seed band mounted in the casing and having a plurality of circumferential rows of openings, said hopper being movable axially of the band for selectively registering the rows of openings of the band with the mouth.

WILLIAM B. BENNETT.